(12) United States Patent
Priness et al.

(10) Patent No.: US 11,436,293 B2
(45) Date of Patent: Sep. 6, 2022

(54) CHARACTERIZING A PLACE BY FEATURES OF A USER VISIT

(71) Applicant: MICROSOFT TECHNOLOGY LICENSING, LLC, Redmond, WA (US)

(72) Inventors: Ido Priness, Herzliya (IL); Dikla Dotan-Cohen, Herzliya (IL); Haim Somech, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 89 days.

(21) Appl. No.: 16/281,680

(22) Filed: Feb. 21, 2019

(65) Prior Publication Data

US 2020/0272676 A1 Aug. 27, 2020

(51) Int. Cl.
*G06F 16/9537* (2019.01)
*G06F 16/9536* (2019.01)
*H04W 4/021* (2018.01)

(52) U.S. Cl.
CPC ...... *G06F 16/9537* (2019.01); *G06F 16/9536* (2019.01); *H04W 4/021* (2013.01)

(58) Field of Classification Search
CPC . G06F 16/9537; G06F 16/9536; H04W 4/021
See application file for complete search history.

(56) References Cited

U.S. PATENT DOCUMENTS

| 2015/0148061 | A1* | 5/2015 | Koukoumidis | H04W 4/022 455/456.1 |
| 2016/0140227 | A1* | 5/2016 | Lymberopoulos | G06Q 10/10 707/748 |
| 2016/0295372 | A1* | 10/2016 | Kapicioglu | G06F 16/29 |
| 2016/0321551 | A1* | 11/2016 | Priness | G06Q 30/0261 |
| 2017/0039480 | A1* | 2/2017 | Bitran | G06N 7/005 |
| 2017/0124465 | A1* | 5/2017 | Yang | G06Q 10/109 |
| 2017/0140041 | A1* | 5/2017 | Dotan-Cohen | G06Q 10/101 |
| 2017/0228804 | A1* | 8/2017 | Soni | G06Q 30/0641 |
| 2017/0264661 | A1* | 9/2017 | Hobson | H04L 65/601 |
| 2018/0196880 | A1* | 7/2018 | Carter | G06F 16/9535 |
| 2019/0205939 | A1* | 7/2019 | Lal | H04L 67/18 |

OTHER PUBLICATIONS

"International Search Report and Written Opinion Issued in PCT Application No. PCT/US2020/017103", dated May 15, 2020, 10 Pages.

* cited by examiner

*Primary Examiner* — Alford W Kindred
*Assistant Examiner* — Lin Lin M Htay
(74) *Attorney, Agent, or Firm* — Shook, Hardy & Bacon L.L.P.

(57) ABSTRACT

Aspects of the technology described herein provide a personalized computing experience for a user based on a user-visit-characterized venue profile. In particular, user visits to a venue are determined. For those visits, user characteristics and/or visit characteristics are determined. User similarities and visit features similarities may be determined and associated with the venue to form the user-visit-characterized venue profile. The user-visit-characterized venue profile may be provided to an application or service such as a personal assistant service associated with the user, or may be provided as an API to facilitate consumption of the user-visit-characterized venue profile by an application or service.

20 Claims, 4 Drawing Sheets

CHARACTERIZING A PLACE BY FEATURES OF A USER VISIT

BACKGROUND

Data can currently be derived about people visiting places or venues. Currently, however, this data is not utilized to learn about, and characterize, the places or venues based on information derived from the visits. Certain data may already be known about these venues, which may come from public directories, websites, social media, etc., but that data is not generated based on the user's characteristics who visit the venue.

The most commonly observed previous technology may provide a user with information about popular times a venue is visited. But this information is incomplete; for example, a particular venue may be popular at a particular time. But the information does not inform a user about the demographic of people during that time period, such as the likely user ages, or whether that set of users has certain dietary restrictions. This data may be helpful to users when making a decision about visiting the venue, and to venues interested in attracting certain users.

It would be helpful to characterize a venue in a more-granular way, based on the features derived from user visits to the venue (e.g., data about the visitors, amount of time specific types of visitors spend at the venue at certain times throughout the day, user activity performed at the venue, where users go before/after the venue) and to then extract or create a structured user-visit-characterized venue profile.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in this disclosure are directed towards systems and methods for providing a personalized computing experience for a user of the technologies described herein based on determining characteristics of a venue based on features of user visits. In particular, embodiments may determine whether a visited venue has an existing venue profile, characterized by user visit data. If no venue profile exists, one will be created. If a venue profile exists, the venue profile will be updated based on characteristics of the latest visit. The profile can contain, for example, patterns of user data from among the number of users who have visited the venue, including temporal patterns (when a specific type of users visit, how long they stay) and behavioral patterns (similar qualities of users, like ages, interests, activities). The profile can also contain, for example, visit feature similarities or patterns. The profile is associated with the venue and made available to user-visit-characterized venue profile consumers allowing the consumers to provide better venue search and business indexing, recommendations to users regarding personalized content regarding the venue, or to more-accurately characterize a location (location disambiguation). In this way, embodiments of the disclosure are able to provide higher granularity and accuracy than previous approaches to providing information or characteristics of a venue.

BRIEF DESCRIPTION OF THE DRAWINGS

Aspects of the technology described in the present application are described in detail below with reference to the attached drawing figures, wherein.

DETAILED DESCRIPTION

The subject matter of aspects of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are directed towards systems, methods, and computer storage media for, among other things, determining features or characteristics of a place (venue) derived from the users that visit the venue, or providing a personalized computing experience based on the determined venue profile. In particular, embodiments may determine user visits to a venue. For users determined to visit the venue, embodiments may determine a set of user characteristics, that are then associated with the venue. Based on the determined user characteristics associated with the venue, embodiments may determine similarities among the determined characteristics and associate those similarities to the venue to form a user-visit-characterized venue profile. In some embodiments, features of the determined visits are determined, and visit feature similarities are determined and associated with the venue to supplement the user-visit-characterized venue profile. In some embodiments, the determined user similarities and visit similarities include one or more user characteristic patterns and one or more visit feature patterns. In some embodiments, any existing and known venue characteristics are also determined and added to the user-visit-characterized venue profile. The user-visit-characterized venue profile may be provided to an application or service such as a personal digital assistant service (or virtual assistant) associated with the user, or may be provided as an application programming interface (API) to facilitate consumption of the user-visit-characterized venue profile by a computing application or service.

In this way, embodiments of the disclosure are able to provide higher granularity, accuracy and freshness than conventional approaches in providing venue information. In particular, some embodiments leverage relevant information about the users who are actually visiting a venue, such as user behavior patterns and visit patterns, to determine a more accurate profile of a venue (as opposed to static information provided by, for example, an owner who would like to attract certain users, that may not actually be visiting the venue).

Figure 1:
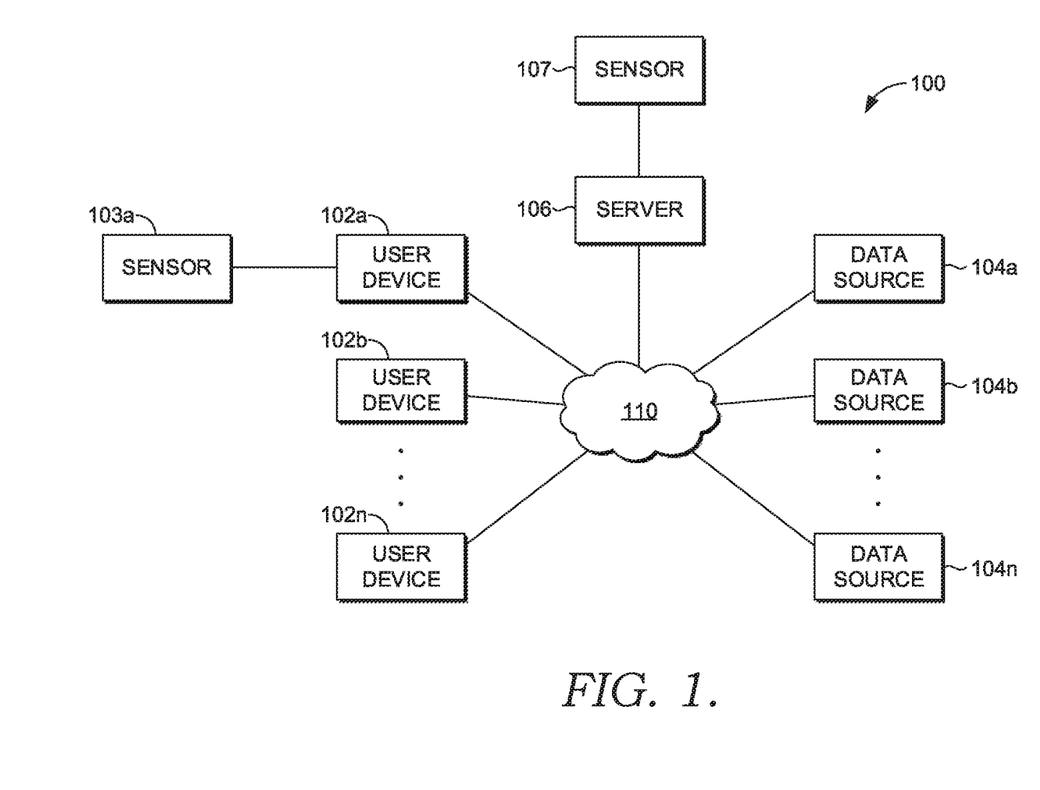
FIG. 1 is a block diagram of an example operating environment suitable for implementing aspects of the disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 400 described in connection to FIG. 4, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 4 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
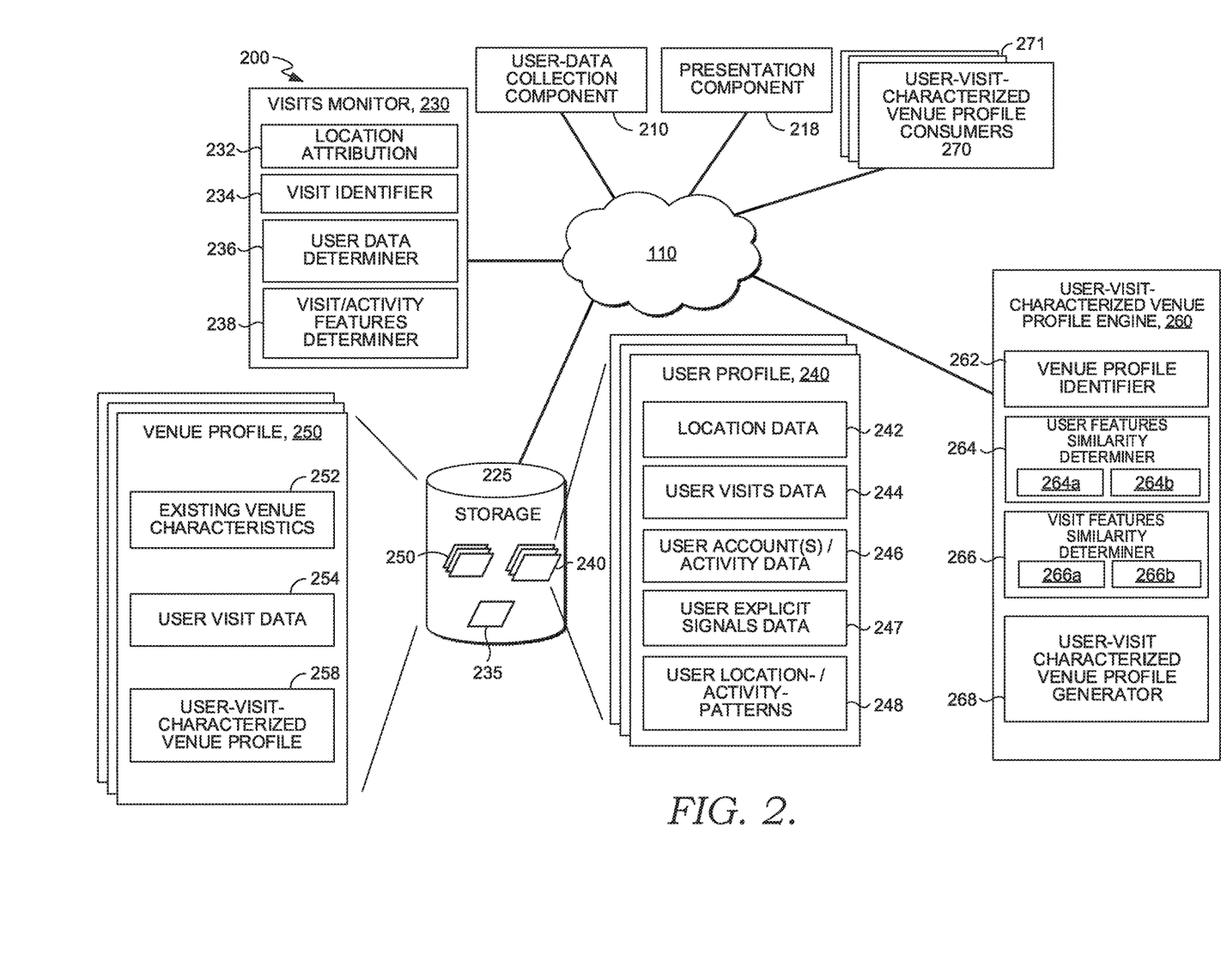
FIG. 2 is a diagram depicting an example computing architecture suitable for implementing aspects of the disclosure.

Operating environment 100 can be utilized to implement one or more of the components of system 200, described in FIG. 2, including components for collecting user data, monitoring user activity and events, determining user visit data, generating a user-visit-characterized venue profile, consuming the user-visit-characterized venue profile to provide an improved user experience, generating personalized content, and/or presenting notifications and related content to users. Operating environment 100 also can be utilized for implementing aspects of process flow 300, described in FIG. 3. Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 218, storage 225, visits monitor 230, user-visit-characterized venue profile engine 260, and one or more user-visit-characterized venue profile consumers 270. User-data collection component 210, presentation component 218, visits monitor 230, and user-visit-characterized venue profile engine 260, may be embodied as a set of compiled computer instructions or functions, program modules, computer software services, or an arrangement of processes carried out on one or more computer systems, such as computing device 400 described in connection to FIG. 4, for example.

In one embodiment, the functions performed by components of system 200 are associated with one or more personal digital assistant (sometimes referred to as "virtual assistant") applications, services, or routines. In particular, such applications, services, or routines may operate on one or more user devices (such as user device 104a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for visits monitor 230, user-visit-characterized venue profile engine 260, or other components or subcomponents of system 200. The data may be received (or accessed), and optionally accumulated, reformatted and/or combined, by user-data collection component 210 and stored in one or more data stores such as storage 225, where it may be available to the components or subcomponents of system 200. For example, the user data may be stored in or associated with a user profile 240, as described herein. In some embodiments, any personally identifying data (i.e., user data that specifically identifies particular users) is either not uploaded from the one or more data sources with the user data, is not permanently stored, is de-identified from any particular user, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information, such as user data, from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, GPS data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data can be received by user-data collection component 210 from one or more sensors and/or computing devices associated with a user. While it is contemplated that the user data is processed, by the sensors or other components not shown, for interpretability by user-data collection component 210, embodiments described herein do not limit the user data to processed data and may include raw data. In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, or as needed.

Visits monitor 230 is generally responsible for monitoring user data for information that may be used for determining current user visit(s) to a location or venue, determining sensed user data, and determining visit/activity features. In some embodiments, information determined by visits monitor 230 may be provided to user-visit characterized venue profile engine 260 or may be stored in user profile 240 and/or venue profile 250.

At a high level, embodiments of visits monitor 230 may use current user data, including location information, to determine or attribute the user's current location, which may be carried out by location attribution component 232, described below. Based on the current location attribution, a current visit for the user may be determined. In some embodiments, a current visit may be determined using features identified from the user data (including current or historical user data), such as how long the user is at a particular location. For example, user data indicating that a user was in the same approximate geographical location for a period of time is more likely to imply a visit occurred than user data indicating the user was only at a particular location briefly (such as in the case where a user is driving by a location, but not visiting it.) Thus, a "visit" may indicate a degree of intention by the user to be at the user's current location. In some embodiments, a visit may be determined where a user remains approximately at the same geographical location over a certain time frame. In contrast, merely passing through a current location or momentarily being at a current location may indicate that a visit has not occurred at the current location. In some embodiments, a current or historic visit may be determined by visit identifier 234, described below, and features and/or activities associated with the visit may be identified by visit activity/features determiner 238, also described below. In some embodiments, visit identifier 234 may also consider user explicit signals, such as a user positively "checking-in" or otherwise affirmatively indicating a presence at a location.

User location history information associated with previous visits to the current location may also be used for determining a current visit, in some embodiments. For instance, in an embodiment, location history information about where a user just came from (the user's previous location) is used for facilitating visit identification, such as where disambiguation is used to identify information about the current visit. For example, where user location history information indicates that the user was previously at a restaurant, and current location information indicates the user is at another geographic location that has a coffee shop and a restaurant, then it may be determined, using disambiguation, that the user is more likely at the coffee shop than at another restaurant.

As shown in example system 200, visits monitor 230 comprises a location attribution component 232, visit identifier 234, user data determiner 236, and visit/activity features determiner 238. In some embodiments, visits monitor 230 and/or one or more of its subcomponents may determine interpretive data from received user data. Interpretive data corresponds to data utilized by the subcomponents of visits monitor 230 (or other components or subcomponents of system 200) to interpret user data. For example, interpretive data can be used to provide context to user data, which can support determinations or inferences made by the subcomponents, such as the disambiguation example described above. Moreover, it is contemplated that embodiments of visits monitor 230, its subcomponents, and other components of system 200 may use user data and/or user data in combination with interpretive data for carrying out the objectives of the subcomponents described herein.

Location attribution component 232, in general, is responsible for determining location attribution using user data, as described previously. Examples of user data may include any user data (or sensor data) indicating location information, such as GPS, wireless communications (e.g., cellular or Wi-Fi Access Point), IP addresses associated with current user activity, user check-in/social-networking information, or other user data from which location information may be determined. In some embodiments, location attribution component 232 attributes the location to a location of interest to the user, such as locations frequented by the user. For example, in some embodiments, locations indicated by the location data may be clustered and the dense clusters used for determining those locations wherein a user spends time. Further, in some embodiments, location attribution component 232 performs filtering, which may remove location information outliers (e.g., a Wi-Fi-derived location data point from 300 yards away suggesting that the user is at that location); clustering; or other means to determine location data for attribution. Embodiments of location attribution component 232 may determine current location and may also perform location attribution with location data associated with the user (such as logged user data or logged location information, which may be stored in a user profile such as historic location data 243 in user profile 240). The current and historic location attributions may be used for determining visits, including current and historical visits.

Visit identifier 234, in general, is responsible for determining (or identifying) a visit has occurred. Embodiments of visit identifier 234 may be used for determining a current visit or one or more historical visits, such as historical visits to the same location as the current visit. Some embodiments of visit identifier 234 may use the location attributions determined by location attribution component 232 to identify a visit. For example, as described previously, user data indicating that a user was in the same approximate geographical location for a period of time may indicate a visit. In particular, in one embodiment, visits may be identified by concatenating consecutive (or substantially consecutive) user location data indicating the user is near the same approximate location, and in some cases filtering out outliers. For instance, visits monitor 230 may monitor location information (which may be obtained from user data provided by a user-data collection component 210), continuously, periodically, or as needed. In some cases, the monitored location information may have a corresponding timestamp for when the location information was sensed or otherwise determined. Thus, a collection of location-time data may be determined that includes data points indicating a location and a corresponding time that the location was detected. In some embodiments, the location-time data comprises a time series of location information. Accordingly, in some embodiments, a visit may be determined based on concatenating consecutive (or approximately consecutive) data points in the time-series that indicate the same approximate location. In some embodiments, the location-time data may be stored in location data 243 or user visit data 244. A current visit may be determined using current location attribution data, and historical visits determined using the historical location attribution data.

After determining that a visit is occurring, or has occurred, user data determiner 236 determines the user data (from user-data collection component 210, or from user profile 240). User data determiner 236, in general, is responsible for determining sensed user data related to the visit(s) as well as other user data and associates that user data with the venue in user visit data 244. The user visit data 244 may include any of the user information collected by user-data collection component 210 described above or stored in user profile 240, such as the time, day, or date of the visit; user activity information (for example: app usage; online activity; website posts; other user interactions with a user device, etc.) including user activity that occurs over more than one user device, user characteristics (age, occupation, dietary restrictions, school affiliations, etc.), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, GPS data, vehicle signal data, traffic data, weather data (including forecasts), other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), data derived based on other data (for example, location data that can be derived from Wi-Fi, cellular network, or IP address data), and nearly any other source of data that may be sensed or determined as described herein. In some embodiments, user data determiner 236 may associate the determined user data and other user data with the related visit. Alternatively, the association or logging may be carried out by another service. For example, some embodiments of user data determiner 236 provide the determined user data to visit/activity features determiner 238, which determines features or variables associated with the visit or user activity (such as described below) and/or related contextual information.

Visit/activity features determiner 238, in some embodiments, determines contextual information related to a visit such as entities related to the visit (e.g., other people present at the location), any venue or venue-related information about the visit already known, or detected activity performed by the user at the location. By way of example and not limitation, this may include context features such as information about the location, such as venue information if known (e.g., this is the user's office location, home location, gym), time (including, for instance, arrival/departure times or duration of stay), day, and/or date, which may be represented as a time stamp associated with the visit, other user activity preceding and/or following the visit, other information about the visit such as entities associated with the visit (e.g., venues, people, objects), information detected by sensor(s) on user devices associated with the user that is concurrent or substantially concurrent to the visit (e.g., user activity detected via a computing device such as watching a streaming movie on an entertainment console, or motion information or physiological information detected on a fitness tracking user device, for example), user interaction on one or more user devices (such as browsing certain types of webpages, listening to music, taking pictures, composing email, or any other type of user device interaction), social media activity, or any other information related to the visit that is detectable that may be used for determining features or patterns associated with user visits.

In embodiments using contextual information related to a user's user devices, a particular user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user profile 240. In an embodiment, the user devices may be polled, interrogated, or otherwise analyzed to determine location information or contextual information about the devices. This information may be used for determining a label or identification of the device (e.g., a device ID) so that contextual information about a particular visit captured on one user device may be recognized and distinguished from data captured by another user device. Where two or more user devices associated with a user are in different locations, visit logic 235 (as described below) may be used to reconcile the location data and determine the most probable location of the user. In some embodiments, users may declare or register a user device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

In some implementations, visit/activity features determiner 238 may receive user data from user-data collection component 210 or user data determiner 236, parse the data, in some instances, and identify and extract context features or variables. Context variables may be stored as a related set of contextual information associated with a visit, and may be stored in a user profile such as in user profile 240 or venue profile 250. For instance, contextual information associated with visits may be stored in user visits data 244.

In some embodiments, visit logic 235 may be utilized for determining a visit, contextual information associated with a visit, and/or features of the visit. Visit logic 235 may include rules, conditions, associations, classification models, or other criteria to identify a visit and contextual information or features associated with the visit. For example, in one embodiment, visit logic 235 may include comparing visit criteria with the user data in order to determine that a visit has occurred and/or particular features associated with a determined visit. The visit logic 235 can take many different forms depending on the mechanism used to identify a particular visit or feature of a visit. For example, the visit logic 235 may comprise training data used to train a neural network that is used to evaluate user data to determine when a visit has occurred, or when particular features are present in a determined visit. The visit logic may comprise static rules (which may be predefined or may be set based on settings or preferences in a user profile associated with the user), Boolean logic, fuzzy logic, neural network, finite state machine, support vector machine, logistic regression, clustering, or machine learning techniques, similar statistical classification processes, other rules, conditions, associations, or combinations of these to identify a visit and/or visit feature from user data. For instance, visit logic may specify types of user device interaction(s) information that are associated with a visit feature, such as launching a fitness tracking app which may occur at a gym, navigating to a website to read a movie review, or composing an email.

In one embodiment, features determined by visit/activity features determiner 238 may be stored as one or more label(s), tag(s), or metadata associated with the visit information, and may be used for indexing visits determined by visit identifier 234. Information about visits determined by visits monitor 230, including in some embodiments the determined contextual information or features associated with the visit(s), may be stored in a user profile 240 associated with a user, such as in user visit data 244 and/or in a venue profile 250 associated with a venue, such as in user visit data 254.

Once a visit has been identified by visits monitor 230, user-visit-characterized venue profile engine 260 is generally responsible for determining if a venue profile exists and to update the existing venue profile, or to create a new venue profile if one does not exist. As shown in example system 200, user-visit-characterized venue profile engine 260 comprises venue profile identifier 262, user features similarity determiner 264, visit feature similarity determiner 266 and user-visit-characterized venue profile generator 268. At a high level, embodiments of user-visit-characterized venue profile engine 260 receive user information, which may be determined by user data collection component 210 or visits monitor 230, or from stored information in user profile 240 or venue profile 250, and utilize this information to generate a venue profile characterized by data about the user(s) and the user's visit(s). In contrast to existing profiles generated by, for example, owners of the business or other people who may not have actually visited the venue, the user-visit-characterized venue profile generated by user-visit-characterized venue profile generator 268 is built using actual data about users who have visited the venue, providing richer, current and more-relevant information. The profile is associated with the venue and made available to user-visit-characterized venue profile consumers 270 allowing them to, for example, provide better venue search and business indexing, provide recommendations to users regarding personalized content regarding the venue, or to more-accurately characterize a location (location disambiguation). In this way, the user-visit-characterized profile 258 provides higher granularity and accuracy of venue information than previous approaches to providing information or characteristics of a venue.

Venue profile identifier 262, in general, is responsible for determining whether a venue profile already exists for the venue associated with the visit. Venue profile identifier 262, in some embodiments, identifies any existing profile stored in user-visit-characterized profile 258 in venue profile 250. If a user-visit-characterized profile 258 exists, venue profile identifier 262, in some embodiments, pushes or otherwise makes available the identified user-visit-characterized profile 258 to presentation component 218 and/or user-visit characterize venue profile consumers 270. Additionally, the identified user-visit characterized profile 258 is made available to the remaining components of user-visit-characterized profile engine 260 to update the identified user-visit-characterized profile 258.

If venue profile identifier 262 determines that a user-visit-characterized profile 258 does not yet exist for the venue visited, the remaining components of user-visit-characterized profile engine 260 create a new user-visit-characterized profile 258. If venue identifier 262 determines that user-visit-characterized profile 258 already exists, the remaining components of user-visit-characterized engine 260 operate to update the existing user-visit-characterized profile 258. More specifically, user features similarity determiner 264 determines categories or characteristics of users identified in the visit, and visit features similarity determiner 266 determines categories or characteristics of the visit. This user and visit data may come from user-data collection component 210, visits monitor 230, or from storage in user profile 240, and may be used in conjunction with one or more user-features pattern determiners (e.g., determiners 264a and 264b in FIG. 2) or visit-feature pattern determiners (e.g., pattern determiners 266a and 266b in FIG. 2).

In some embodiments, user features similarity determiner 264 comprises subcomponents for determining patterns among users associated with visits. For example, as shown in example system 200, user features similarity determiner 264 comprises user activity pattern determiner 264a and user characteristics pattern determiner 264b. User features similarity determiner 264 parses the obtained user data and groups or categorizes the data based on similar user features or patterns or user activity features or patterns. User activity features comprise what a user typically does, for example, common activities like working out, running, categories of work, reading, dancing or other activities in which users might engage. User characteristics comprise, for example, characteristics such as user age, occupation, residence, education, dietary likes or restrictions, or any other characteristics that can be identified with users and that are potentially of interest in characterizing a venue. So, for example and without limitation, user features similarity determiner 264 may generate data indicating users who visit the venue are young-adults generally between the ages of 25-35, with a certain percentage of them identifying as vegan, and are an average of 15 miles from home.

Similarly, in some embodiments, visit features similarity determiner 266 comprises subcomponents for determining patterns among visit features, using data from visits monitor 230, user profile 240 or venue profile 250. For example, as shown in example system 200, visit features similarity determiner 266 comprises periodic features similarity determiner 266a and behavior features similarity determiner 266b. Periodic features comprise, for example, features of visits that occur approximately periodically; for example, visits occurring on the same particular time(s) of day, day of the week or month, even/odd days (or weeks), monthly, yearly, every other day, every $3^{rd}$ day, etc. Behavior features comprise user behaviors such as arrival time, length of stay, user activities (e.g. user behavior) occurring during the visit, previous location visited before the current location (or sequence of previous locations visited, such as the sequence of the last K locations the user visited prior to current visit, for example). In some embodiments of visit features similarity determiner 266, other visit features pattern determiners (not shown) may be utilized, such as features pattern determiners for determining similarity between the presence of other people at the visit, such as contacts or social media acquaintances of the user, or similarity of any other aspect, feature, or context associated with a visit. So, for example and without limitation, visit features similarity determiner 266 may generate data indicating users who visit the venue stay an average of 75 minutes, that young-adults between the ages of 25-35 are the most-frequent visitors between 8 p.m. and 12 p.m., and that this group spends an average of $37.87 per visit.

Data from user features similarity determiner 264 and visit features similarity determiner 266 may be provided to user-visit-characterized venue profile generator 268, or may be stored in venue profile 250. User-visit-characterized venue profile generator 268 either creates a new user-visit-characterized venue profile, or updates an existing user-visit-characterized venue profile 258. At a high level, user-visit-characterized profile generator 268 receives user features and patterns (from user features similarity determiner 264, or from user profile 240, or from user visit data 254), as well as visit features and patterns (from visit features pattern determiner 266 or from user profile 240 or venue profile 250), along with any other known existing venue characteristics, such as from existing venue characteristics 252 or from an existing user-visit-characterized venue profile 258. If any user explicit signals are available from user explicit signals 247, they are also obtained by user-visit-characterized venue profile generator 268. User-visit-characterized venue profile generator 268 uses the obtained data to generate or update the user-visit-characterized profile 258 and stores it in venue profile 250.

The user-visit-characterized venue profile 258 thus associates various collected and determined user features and patterns, and visit features and patterns with a particular venue. The user-visit-characterized venue profile 258 is then provided to, or accessible by, presentation component 218 and/or user-visit-characterized venue profile consumers 270. The user-visit-characterized venue profile 258 profile allows the consumers to, for example, provide better venue search and business indexing, provide enriched recommendations to users regarding personalized content regarding the venue, or to more-accurately characterize a location.

As an example, the user-visit-characterized venue profile generator 268 may determine, from venue profile identifier 262 that a venue profile exists indicating that the venue is a community center with activities available for all ages. User-visit-characterized venue profile generator 268 may also determine, from user features similarity determiner 264 and visit features similarity determiner 266, user visit patterns indicating that older adults visit the venue in the morning with an average visit time of one hour, younger (children) visit the venue in the afternoon with an average visit time of two hours, and teenagers visit the venue in the evenings, coming straight from school, with an average visit time of two-and-a-half hours. This feature and pattern information is added to the existing venue profile and stored in user-visit-characterized profile 258.

As another example, the user-visit-characterized venue profile generator 268 may determine from venue profile identifier 262 that a user-visit-characterized venue profile 258 does not yet exist. Even though a user-visit-characterized venue profile 258 does not yet exist, user-visit-characterized venue profile generator 268 may obtain any known existing venue characteristics from venue profile 250 (stored in existing venue characteristics 252), indicating, for example, that the venue is a restaurant. The user-visit-characterized venue profile generator 268 may determine, from user features similarity determiner 264 and visit features similarity determiner 266, user visit features indicating users visiting the venue: identify as vegan, or have other dietary restrictions or preferences; live an average of ten miles from the venue; have an average visit stay of one hour on weekdays, and of an hour and forty-five minutes on weekends; on weekends, a percentage of users leave the venue and travel to a nearby entertainment venue; and/or that on rainy days the attendance is sixty percent the attendance on sunny days.

The user-visit-characterized venue profile 258, in some embodiments, is modified as users visit the venue. These modifications may add, delete, or change the existing user-visit-characterized venue to improve the profile and keep the profile current.

Continuing with FIG. 2, example system 200 also includes one or more user-visit-characterized profile consumers 270. User-visit-characterized venue profile consumers 270 comprise computing applications or computing services that consume the user-visit-characterized profile 258 to provide an improved experience for the user, or to provide a better understanding of visitors (greater granularity of information) to the venue which could be used to improve the offering of the venue, or to attract more users by exposing these insights. As described herein, the generated user-visit-characterized venue profile 258 may be provided to computer applications or services (e.g., user-visit-characterized venue profile consumers 270), which may include an aspect of a virtual assistant computer program associated with the user. In some embodiments, the user-visit-characterized venue profile 258 may be provided in connection with an API to facilitate their utilization by a user-visit-characterized venue profile consumer 270. Examples of user-visit-characterized venue profile consumers 270 may include, without limitation, venue search and business indexing services, personalized content services, venue recommendation applications or services, or other computing services that may be tailored to a user based on knowledge of the user-visit-characterized venue profile. Some embodiments of user-visit-characterized venue profile consumers 270 may be carried out by a virtual assistant application or service, which may be implemented as one or more computer programs (which may comprise one or more applications, services, or routines), such as an app running on a mobile device and/or in the cloud, as further described herein.

In particular, one example of a user-visit-characterized venue profile consumer 270 comprises a content personalization service. In one embodiment of user-visit-characterized profile consumers 270, a content personalization engine 271 is provided to facilitate providing a personalized user experience. Thus, content personalization engine 271 may be considered one example of an application or service (or set of applications or services) that may consume information about a user-visit-characterized venue profile as determined by implementations of the present disclosure. At a high level, example content personalization engine 271 is responsible for generating and providing aspects of personalized user experiences, such as personalized content or tailored delivery of content to a user. The content may be provided to the user as a personalized notification (such as described in connection to presentation component 218), may be provided to an application or service of the user, or may be provided as part of an API where it may be consumed by yet another application or service.

In one embodiment, the personalized content may include a notification, which may comprise information, a recommendation, suggestion, request, communication-related data (e.g., an email, instant message), or includes similar content that may be provided to the user in a way that is personalized. For example, embodiments intelligently route user communications, or provide notifications or other content to the user that is relevant to the user and based on the user-visit-characterized venue profile 258. For example, if a user is in a known location, and it is near dinner time, suggestions for dinner may be presented to the user regarding restaurants nearby that are known to be vegan friendly, and not typically crowded in the next hour (based on information in the user-visit-characterized profile 258). In some embodiments, the user-visit-characterized venue profile 258 may be used to better characterize a venue, such as when a venue is thought to be either a restaurant or a bar, and it would be helpful to know if it is more of a bar that serves food, or a restaurant that serves some alcohol (location disambiguation). The user-visit-characterized venue profile 258 may be used by one or more user-visit-characterized venue profile consumers 270 to determine that a majority of people visit the venue, for example, after visiting a nearby restaurant. In this example, the user-visit-characterized venue profile consumer 270 may then characterize the venue as more of a bar that serves some food. Venues may also be (or use) the user-visit-characterized venue profile consumer 270. As an example, the venue may use user-visit-characterized venue profile 258 to better understand the visitors in good granularity to improve the offering of the venue or to attract more users by exposing certain insights. For example, a venue may not currently feature entrees directed to vegetarians, but may learn from user-visit-characterized venue profile 258 that the percentage of vegetarian users visiting the venue is increasing and may alter the menu offerings to include one or more vegetarian entrees.

In some embodiments, content personalization engine 271 tailors content for a user to provide a personalized user experience. For example, content personalization engine 271 may generate a personalized notification to be presented to a user, which may be provided to presentation component 218. Alternatively, in other embodiments, content personalization engine 271 generates content from the user-visit-characterized venue profile 258 and makes it available to presentation component 218, which determines when and how (i.e., what format) to present the profile content based on user data.

Example system 200 also includes a presentation component 218 that is generally responsible for presenting content and related information to a user, such as the personalized content from content personalization engine 271 or content from other user-visit-characterized profile consumers 270. Presentation component 218 may comprise one or more applications or services on a user device, across multiple user devices, or in the cloud. For example, in one embodiment, presentation component 218 manages the presentation of content to a user across multiple user devices associated with that user. In some embodiments, presentation component 218 may determine on which user device(s) content is presented, as well as the context of the presentation, such as how (or in what format and how much content, which can be dependent on the user device or context) it is presented, when it is presented, etc. In some embodiments, presentation component 218 generates user interface features associated with the personalized content. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

Storage 225 generally stores information including data, computer instructions (e.g., software program instructions, routines, or services), logic, profiles and/or models used in embodiments of the disclosure described herein. In an embodiment, storage 225 comprises a data store (or computer data memory). Further, although depicted as a single data store component, storage 225 may be embodied as one or more data stores or may be in the cloud.

Some embodiments of example user profile 240 may include information associated with a particular user or, in some instances, a category of users. As shown, user profile 240 includes user location data 242, user visit data 244, user account(s) and activity data 246, user explicit signals data 247, and/or user location/activity patterns 248, some of which have been described previously. The information stored in user profiles 240 may be available to the routines or other components of example system 200.

User account(s) and activity data 246 generally includes user data determined from user-data collection component 210 (which in some cases may include crowdsourced data that is relevant to the particular user), and may be used for determining current and historic visit-related information, such as location information, features associated with visits (past or future), and/or explicit signals, for example. User account(s) and activity data 248 also may include information about user devices accessed, used, or otherwise associated with a user, and/or information related to user accounts associated with the user; for example, online or cloud-based accounts (e.g., email, social media) such as a Microsoft® Net passport, other accounts such as entertainment or gaming-related accounts (e.g., Xbox live, Netflix, online game subscription accounts), user data relating to such accounts as user emails, texts, instant messages, calls, other communications, and other content; social network accounts and data, such as news feeds; online activity; and calendars, appointments, application data, or other user data that may be used for determining current or historic visit features or explicit signals. The data in user account(s) and activity data 246 can be used, for example, by user features similarity determiner 264 and/or visit features similarity determiner 266 in creating user-visit-characterized venue profile 258.

Figure 3:
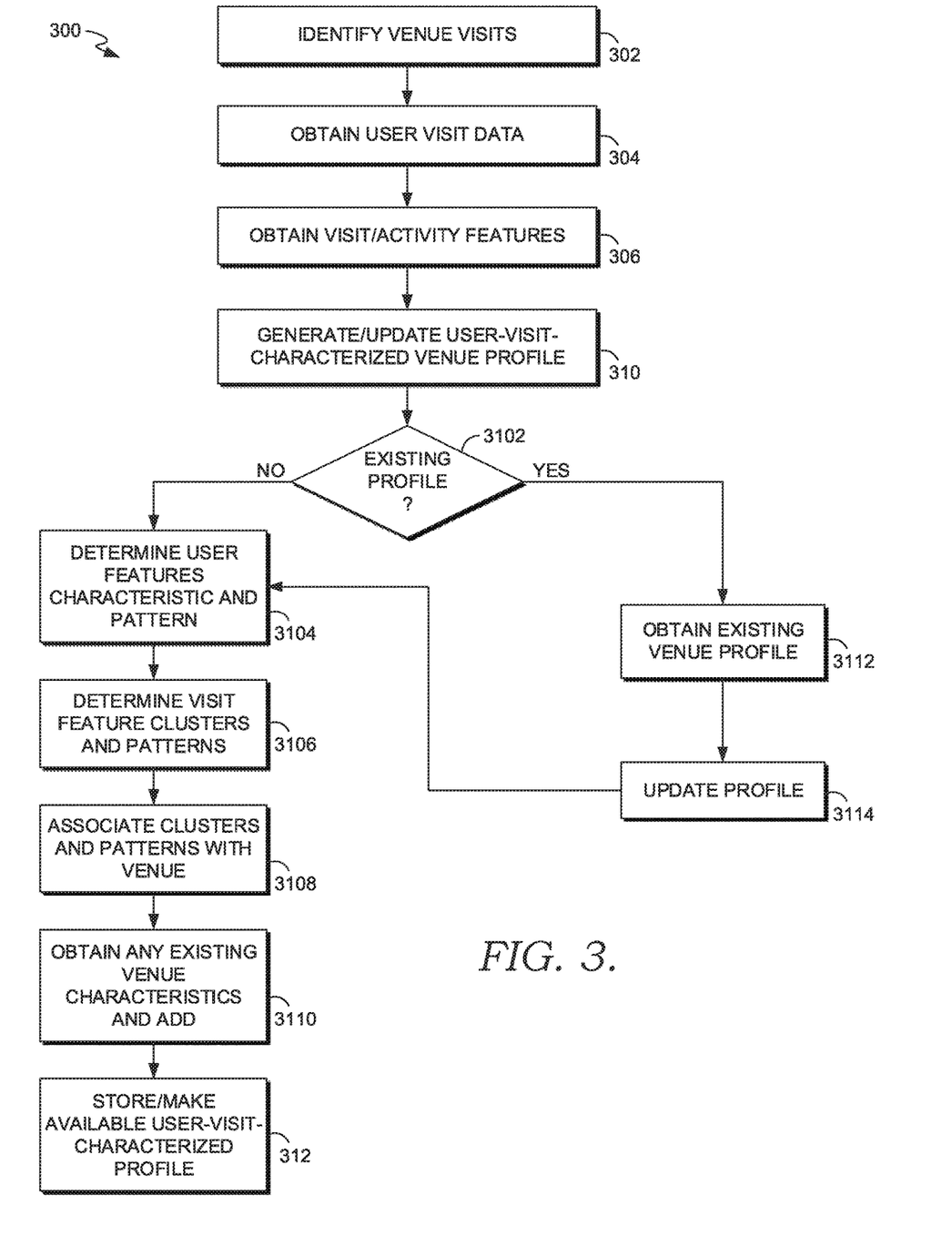
FIG. 3 depicts an example process flow for characterizing a venue based on user visit data, in accordance with an embodiment of the disclosure.

Turning now to FIG. 3, aspects of an example process flow 300 are illustratively depicted for an embodiment of the disclosure. In particular, FIG. 3 depicts an overview of process flow 300 and the blocks of process flow 300 that correspond to actions (or steps) to be performed (as opposed to information to be acted on) may be carried out by one or more computer applications or services, in some embodiments, including a virtual assistant, that operate on one or more user devices (such as user device 104a), servers (such as server 106), may be distributed across multiple user devices and/or servers, or may be implemented in the cloud. In one embodiment, the functions performed by the steps of process flow 300 are carried out by components of system 200, described in connection to FIG. 2.

With reference to FIG. 3, an overview of process flow 300 is illustratively provided. At block 302, venue visits are identified. Visits identification 302 can be performed, in some embodiments, by visits monitor 230 to determine a user visit as distinguished from a user drive-by, for example. At block 304, user visit data is obtained. User visit data can be captured, in some embodiments, by user data determiner 236 or can be obtained from one or more storage locations in user profile 240 or from user visit data 254. User visit data 254 may include all available user information able to be sensed and determined from the user's devices as discussed above or acquired from user profile 240. User visit data obtained at block 304 may thus include data somehow related to the user visit, but may also include data related only to the user. At block 306, visit/activity features are obtained. In some embodiments, the visit/activity features are obtained from visit/activity features determiner 238, or from one of more storage locations in user profile 240. With the venue visits identified at block 302, and data obtained at blocks 304 and 306, the method 300 continues at block 310 by generating and/or updating a user-visit-characterized venue profile.

At block 310, the method continues by using the obtained information to generate or update a user-visit-characterized venue profile, and specifically continues with block 3102, by determining if an existing venue profile exists. In some embodiments, venue profile identifier 262 makes the determination of block 3102 (such as by checking to see if a user-visit-characterized venue profile 258 exists for the venue. If a venue profile does not yet exist, at block 3104, user feature (characteristics) clusters and patterns are determined (for example, certain age groups, common dietary restrictions, affinity groups (runners, sports fans, country music fans, or tourists vs. locals, in user-routine or out of user routine, gender or any of the others noted above). In some embodiments, user features similarity determiner 264 (and user features pattern determiner(s) 264(*a*) and 264(*b*)) identifies user features associated with the venue, and clusters or aggregates them into categories and/or patterns. Similarly, at block 3106, visit features clusters and patterns are determined. In some embodiments, visit features similarity determiner 266 (and visit features pattern determiner(s) 266(*a*) and 266(*b*)) identifies visit features associated with the venue, and clusters or aggregates them into categories and/or patterns (for example, length of visits, times of day, days of week, average spend per visit or any of the others noted above). At block 3108, the determined user and visit features clusters and patterns are associated with the venue. Additionally, in some embodiments, at block 3110, any existing venue characteristics are obtained (such as from existing venue characteristics 252) and are also added to the user-visit-characterized venue profile. If a venue profile already exists (from block 3102), the existing profile is obtained at block 3112. At block 3114, the existing venue profile is updated by repeating the steps of blocks 3104-3110. At block 312, the generated or updated user-visit-characterized profile is stored (in some embodiments, in user-visit-characterized venue profile 258) or made available (such as to presentation component 218 or to user-visit-characterized venue profile consumers 270).

Accordingly, we have described various aspects of technology directed to systems and methods for characterizing a venue based on characteristics and features of users visiting the venue. It is understood that various features, sub-combinations, and modifications of the embodiments described herein are of utility and may be employed in other embodiments without reference to other features or sub-combinations. Moreover, the order and sequences of steps shown in the example method 300 is not meant to limit the scope of the technologies described herein in any way, and in fact, the steps may occur in a variety of different sequences within embodiments hereof. Such variations and combinations thereof are also contemplated to be within the scope of embodiments of the disclosure.

Figure 4:
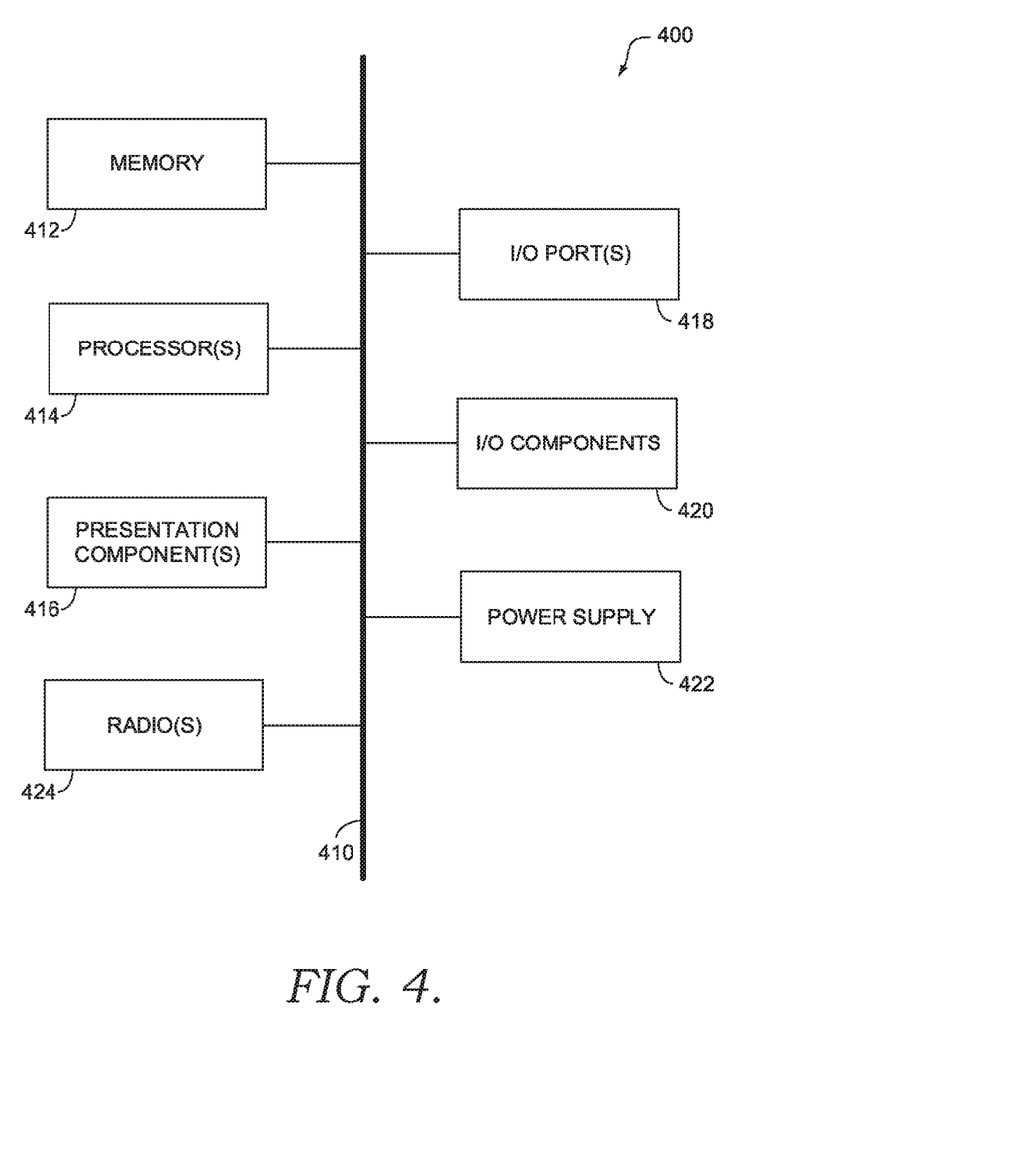
FIG. 4 is a block diagram of an exemplary computing environment suitable for use in implementing an embodiment of the disclosure.

Having described various embodiments of the disclosure, an exemplary computing environment suitable for implementing embodiments of the disclosure is now described. With reference to FIG. 4, an exemplary computing device is provided and referred to generally as computing device 400. The computing device 400 is but one example of a suitable computing environment and is not intended to suggest any limitation as to the scope of use or functionality of the disclosure. Neither should the computing device 400 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 4, computing device 400 includes a bus 410 that directly or indirectly couples the following devices: memory 412, one or more processors 414, one or more presentation components 416, one or more input/output (I/O) ports 418, one or more I/O components 420, and an illustrative power supply 422. Bus 410 represents what may be one or more busses (such as an address bus, data bus, or combination thereof). Although the various blocks of FIG. 4 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 4 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 4 and with reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors 414 that read data from various entities such as memory 412 or I/O components 420. Presentation component(s) 416 presents data indications to a user or other device. Exemplary presentation components include a display device, speaker, printing component, vibrating component, and the like.

The I/O ports 418 allow computing device 400 to be logically coupled to other devices, including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as stereoscopic camera systems, infrared camera systems, RGB camera systems, and combinations of these, for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

Some embodiments of computing device 400 may include one or more radio(s) 624 (or similar wireless communication components). The radio 424 transmits and receives radio or wireless communications. The computing device 400 may be a wireless terminal adapted to receive communications and media over various wireless networks. Computing device 400 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computerized system comprising:
one or more sensors configured to provide sensor data relating to users;
one or more processors; and
computer storage memory having computer-executable instructions stored thereon which, when executed by the one or more processors, implement a method of providing a personalized computing experience to a first user based on a user-visit-characterized venue profile, the method comprising:
determining, using the one or more sensors, user visits to a venue by a plurality of users;
collecting user data associated with the user visits, thereby providing historical user data;
determining, for the plurality of users determined to visit the venue, a set of user characteristics based at least in part on the historical user data;
associating the set of user characteristics with the venue;
determining user similarities among the set of user characteristics associated with the venue;
determining categories of users based at least in part on the user similarities;
inferring characteristics of the venue based at least in part on the user similarities categories of users;
forming the user-visit-characterized venue profile that characterizes the venue, based at least in part on the inferred characteristics of the venue; and
causing presentation, to the first user, of an indication of the venue and at least a portion of information about the venue from the user-visit-characterized venue profile.

2. The computerized system of claim 1, wherein the personalized computing experience comprises a personalized content computing service.

3. The computerized system of claim 1, wherein determining user similarities includes determining one or more user characteristic patterns.

4. The computerized system of claim 1, wherein the computer-executable instructions in the computer storage memory implement the method further comprising:
- determining, for the user visits, visit features;
- associating the determined visit features with the venue;
- based at least in part on the determined visit features associated with the venue, determining visit feature similarities between the user visits associated with the determined visit features, and associating the visit feature similarities with the venue to supplement the user-visit-characterized venue profile.

5. The computerized system of claim 4, wherein determining visit feature similarities includes determining one or more visit feature patterns.

6. The computerized system of claim 1, wherein the computer-executable instructions in the computer storage memory implement the method further comprising:
- determining existing venue characteristics; and
- adding the determined existing venue characteristics to the formed user-visit-characterized venue profile.

7. The computerized system of claim 1, wherein the computer-executable instructions in the computer storage memory implement the method further comprising:
- identifying any preexisting user-visit-characterized venue profile; and
- wherein forming the user-visit-characterized venue profile includes adding the determined user similarities among the determined user characteristics to any identified preexisting user-visit-characterized venue profile.

8. The computerized system of claim 1, wherein presenting the indication of the venue and the at least a portion of information about the venue comprises sending a notification to the first user, the notification including a characterization of the venue determined at least in part from the user-visit-characterized venue profile.

9. A computing device comprising a computer memory and a computer processor that is configured to allow a virtual assistant to determine and utilize a user-visit-characterized venue profile to provide a personalized experience, the computing device comprising:
- the virtual assistant that is a computer program stored on the computer memory having computer instructions that when executed by the computer processor cause the virtual assistant to:
- determine user visits to a venue by a plurality of users;
- collecting user data associated with the user visits, thereby providing historical user data;
- determine, for the plurality of users determined to visit the venue, a set of user characteristics based at least in part on the historical user data;
- associate the set of user characteristics with the venue;
- determining user similarities among the set of user characteristics;
- determining categories of users based at least in part on the user similarities;
- inferring characteristics of the venue based at least in part on the categories of users;
- forming the user-visit-characterized venue profile that characterizes the venue, based at least in part on the inferred characteristics of the venue; and
- causing presentation, to a first user, of an indication of the venue and at least a portion of information about the venue from the user-visit-characterized venue profile.

10. The computing device of claim 9, wherein determining user similarities includes determining one or more user characteristic patterns.

11. The computing device of claim 9, the virtual assistant having further computer instructions that when executed by the computer processor further cause the virtual assistant to:
- determine, for the user visits, visit features;
- associate the determined visit features with the venue; and
- based on the determined visit features associated with the venue, determine visit feature similarities among the determined visit features and associate the visit feature similarities with the venue to supplement the user-visit-characterized venue profile.

12. The computing device of claim 11, wherein determining visit feature similarities includes determining one or more visit feature patterns.

13. The computing device of claim 9, the virtual assistant having further computer instructions that when executed by the computer processor further cause the virtual assistant to:
- determine existing venue characteristics; and
- add the determined existing venue characteristics to the formed user-visit-characterized venue profile.

14. The computing device of claim 9, the virtual assistant having further computer instructions that when executed by the computer processor further cause the virtual assistant to:
- identify any preexisting user-visit-characterized venue profile; and
- wherein forming the user-visit-characterized venue profile includes adding the determined user similarities among the determined user characteristics to any identified preexisting user-visit-characterized venue profile.

15. The computing device of claim 9, wherein presenting the indication of the venue and the at least a portion of information about the venue comprises sending a notification to the first user including a description of the venue determined at least in part from the user-visit-characterized venue profile.

16. A computerized method for providing a personalized computing experience to a first user based on a user-visit-characterized venue profile, the method comprising:
- determining user visits to a venue by a plurality of users;
- collecting user data associated with the user visits, thereby providing historical user data;
- determining, for the plurality of users determined to visit the venue, a set of user characteristics based at least in part on the historical user data;
- associating the set of user characteristics with the venue;
- determining user similarities among the set of user characteristics;
- determining categories of users based at least in part on the user similarities;
- inferring characteristics of the venue based at least in part on the categories of users;
- forming the user-visit-characterized venue profile that characterizes the venue, based at least in part on the inferred characteristics of the venue; and
- generating and causing presentation of personalized content to the first user, the personalized content comprising information about the venue that is tailored based at least in part on the user-visit-characterized venue profile.

17. The computerized method of claim 16, wherein determining user similarities includes determining one or more user characteristic patterns.

18. The computerized method of claim 16, further comprising:
- determining for the user visits, visit features;
- associating the determined visit features with the venue;
- based on the determined visit features associated with the venue, determining visit feature similarities among the determined visit features and associating the visit feature similarities with the venue to supplement the user-visit-characterized venue profile.

19. The computerized method of claim 16, further comprising:
   determining existing venue characteristics; and
   adding the determined existing venue characteristics to the formed user-visit-characterized venue profile.

20. The computerized method of claim 16, further comprising:
   identifying any preexisting user-visit-characterized venue profile; and
   wherein forming the user-visit-characterized venue profile includes adding the determined user similarities among the determined user characteristics to any identified preexisting user-visit-characterized venue profile.

* * * * *